United States Patent Office 3,284,475
Patented Nov. 8, 1966

3,284,475
17β - (DIALKYLAMINOALKYL)AMINOESTRA - 1,3,
5(10)-TRIEN-3-OLS, ALKYL AND ACYL DERIVATIVES THEREOF
Paul D. Klimstra, Northbrook, Ill., assignor to G. D. Searle & Co., Chicago, Ill., a corporation of Delaware
No Drawing. Filed Feb. 8, 1965, Ser. No. 431,183
11 Claims. (Cl. 260—397.4)

The present invention relates to novel steroidal diamines and alkyl and acyl derivatives corresponding. More particularly, the substances are 17β-N-(dialkylaminoalkyl) aminoestra-1,3,5(10)-trien-3-ols and alkyl and acyl derivatives thereof and can be represented by the following structural formula

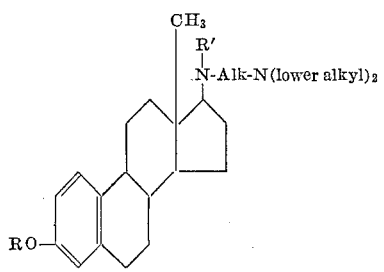

wherein R can be hydrogen or a formyl or lower alkyl radical, R' is hydrogen, a formyl or methyl radical, and Alk is symbolic of a lower alkylene radical.

The lower alkylene radicals encompassed by the foregoing structural formula are represented by the formula $C_nH_{2n}$ and are typified by methylene, ethylene, trimethylene, tetramethylene, pentamethylene, and the branched-chain radicals isomeric therewith. Examples of the lower alkyl radicals therein depicted are methyl, ethyl, propyl, butyl, pentyl, hexyl, heptyl, and the branched-chain radicals thereof.

Equivalent to the instant amines for the purposes of this invention are the corresponding non-toxic acid addition and quaternary salts which are exemplified by the citrate, tartrate, maleate, ascorbate, gluconate, lactate, succinate, phosphate, sulfate, hydrobromide, hydrochloride, ethiodide, methiodide, methochloride, methobromide, methosulfate, and ethosulfate.

The compounds of this invention display useful and valuable pharmacological properties. They are hypocholesterolemic agents, for example, and they possess the particular advantage of minimal estrogenic side-effects. In addition, they are anti-hormonal agents as is evidenced by their ability to inhibit the anabolic activity of testosterone propionate. These compounds are also antibiotic substances in consequence of their anti-algal, anti-bacterial, anti-protozoal, and dicotyledenous seed germination-inhibitory activity. In particular, they possess the ability to inhibit the growth of organisms such as *Chlorella vulgaris*, *Diplococcus pneumoniae*, and *Tetrahymena gelleii*.

The instant novel compounds are conveniently manufactured by utilizing as starting materials 3-oxygenated estra-1,3,5(10)-trien-17-ones of the structural formula

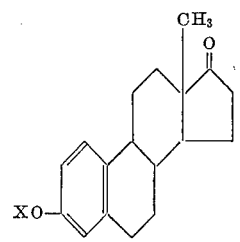

wherein X is hydrogen or a lower alkyl or lower alkanoyl radical represented by the formula

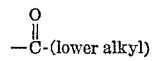

Condensation of those ketones with the appropriate aliphatic diamine in the presence of formic acid results in the corresponding 3-oxygenated 17β-N-(ω-dialkylaminoalkyl)-formamidoestra-1,3,5(10)-trienes of the structural formula

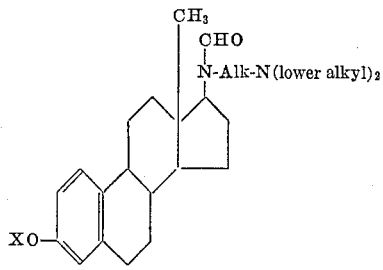

wherein X and Alk are as hereinbefore defined. An illustration of that process is the reaction of 3-hydroxyestra-1,3,5(10)-trien-17-one with 3-dimethylaminopropylamine and formic acid at elevated temperature to yield 17β-N-(3 - dimethylaminopropyl)formamidoestra-1,3,5(10)-trien-3-ol 3-formate.

Cleavage of the N-formyl group of the latter substances is readily effected by reaction with a mineral acid, thus affording the corresponding diamines. Typically, the aforementioned 17β - N-(3-dimethylaminopropyl)formamidoestra-1,3,5(10)-trien-3-ol 3-formate is contacted with isopropanolic hydrogen chloride to produce 17β-N-(3 - dimethylaminopropyl)aminoestra - 1,3,5(10) - trien-3-ol.

Reduction of those formyl compounds, on the other hand, typically with a suitable chemical reducing agent, affords the instant N-methyl compounds. As a specific example, 17β - N-(3-dimethylaminopropyl)formamidoestra-1,3,5(10)-trien-3-ol 3-methyl ether is contacted with lithium aluminum hydride in dioxane to produce 17β-N-(3-dimethylaminopropyl)-N-methylaminoestra-1,3,5(10)-trien-3-ol 3-methyl ether.

An alternate route to the N-methyl compounds of this invention involves alkylation of the corresponding compounds possessing a secondary-amino nitrogen substituent at carbon atom 17. Reaction of 17β-N-(3-dimethylaminopropyl)aminoestra-1,3,5(10)-trien-3-ol 3-methyl ether with formic acid and formaldehyde thus results in the aforementioned 17β-N-(3-dimethylaminopropyl)-N-methylaminoestra-1,3,5(10)-trien-3-ol 3-methyl ether.

The instant compounds wherein R' is hydrogen can be produced alternatively by reaction between the aforementioned 17-ketones and diamines in the presence of an acidic catalyst. The amines thus obtained are then reduced, either chemically or by catalytic hydrogenation, to produce the instant substances. A specific example is the reaction of 3-hydroxyestra-1,3,5(10)-trien-17-one with 3-dimethylaminopropylamine in the presence of p-toluenesulfonic acid to afford 17-N-(3-dimethylaminopropyl)iminoestra - 1,3,5(10) - trien - 3 - ol, which is contacted with lithium aluminum hydride to yield the instant 17β - N - (3 - dimethylaminopropyl)aminoestra-1,3,5(10)-trien-3-ol.

The invention is illustrated more fully by the examples which follow. These examples are set forth by way of illustration only and it will be understood that the invention is not to be construed as limited either in spirit or in scope by the details contained therein as many modifications both in materials and methods will be apparent to those skilled in the art. In these examples, temperatures are given in degrees centigrade (°C.). Quantities of materials are expressed in parts by weight unless otherwise noted.

*Example 1*

To a solution of 20 parts of 3-hydroxyestra - 1,3,5(10)-trien-17-one in 90 parts of formic acid is added dropwise, with cooling and stirring over a period of about 15 minutes, 40 parts of 3-dimethylaminopropylamine. The resulting reaction mixture is heated at 170–180° for about 72 hours, during which time the reaction mixture becomes homogenous. It is then cooled and poured carefully into an aqueous solution containing 80 parts of sodium hydroxide. That alkaline mixture is cooled to 0–5°, then is extracted with chloroform, and the organic layer is separated, washed with water, dried over anhydrous sodium sulfate containing decolorizing carbon and stripped of solvent under reduced pressure. The resulting oily residue is crystallized from acetone to afford 17β-N-(3-dimethylaminopropyl)formamidoestra - 1,3,5(10)-trien-3-ol 3-formate, melting at about 191–192.5° and displaying an optical rotation of +17.5° in chloroform. This compound is represented by the following structural formula

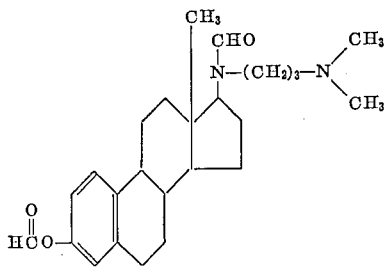

*Example 2*

By substituting an equivalent quantity of 2-diethylaminoethylamine and otherwise proceeding according to the processes described in Example 1, there is obtained 17β-N-(2-diethylaminoethyl)formamidoestra - 1,3,5(10)-trien-3-ol 3-formate.

*Example 3*

To a solution of 20 parts of 3-methoxyestra-1,3,5(10)-trien-17-one in 67 parts of formic acid is added, dropwise with cooling and stirring over a period of about 15 minutes, 40 parts of 3-dimethylaminopropylamine. Heating of that reaction mixture at 170–180° for about 96 hours results in a homogeneous mixture, which is then cooled and poured carefully into an aqueous solution containing 70 parts of sodium hydroxide. That alkaline mixture is stirred for about one hour, then is filtered in order to remove the precipitate. The precipitate is washed on the filter with water, then is extracted with ethyl acetate. The resulting organic solution is separated, dried over anhydrous sodium sulfate containing decolorizing carbon and evaporated to dryness under reduced pressure. The solid residue is recrystallized from hexane to afford pure 17β - N - (3 - dimethylaminopropyl - formamidoestra-1,3,5(10)-trien-3-ol 3-methyl ether, melting at about 99–100°. This compound can be represented by the following structural formula

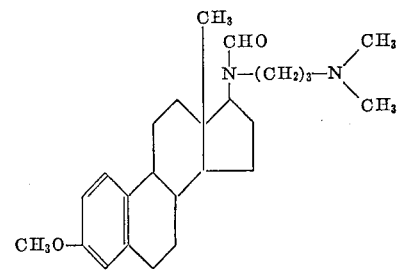

*Example 4*

To an ethereal solution of 17β - N - (9 - dimethylaminopropyl)formamidoestra - 1,3,5(10) - trien - 3 - ol 3-methyl ether is added an equivalent quantity of isopropanolic hydrogen chloride. The resulting precipitate is collected by filtration and dried to afford 17β - N - (3 - dimethylaminopropyl)formamidoestra - 1,3,5(10) - trien - 3 - ol 3-methyl ether hydrochloride, characterized by an optical rotation, in ethanol, of +19°.

*Example 5*

The substitution of equivalent quantities of 3-ethoxyestra - 1,3,5(10) - trien - 17 - one and 2 - diethylaminoethylamine in the procedure of Example 3 results in 17β-N - (2 - diethylaminoethyl)formamidoestra - 1,3,5(10)-trien-3-ol 3-ethyl ether.

*Example 6*

To a solution of 17β-N-(3-dimethylaminopropyl)-formamidoestra-1,3,5(10)-trien-3-ol 3-formate in acetone is added excess isopropanolic hydrogen chloride. The resulting precipitate is recrystallized from ethanolhexane to afford 17β-N-(3-dimethylaminopropyl)aminoestra-1,3,5(10)-trien-3-ol dihydrochloride, characterized by the following structural formula

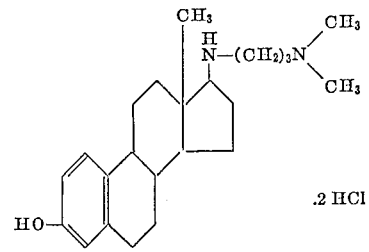

*Example 7*

By substituting an equivalent quantity of 17β-N-(2-diethylaminoethyl)formamidoestra - 1,3,5(10)-trien-3-ol 3-formate and otherwise proceeding according to the processes described in Example 6, there is obtained 17β-N-(2-diethylaminoethyl)aminoestra - 1,3,5(10)-trien-3-ol dihydrochloride.

*Example 8*

To a mixture of 7 parts of lithium aluminum hydride with 250 parts of dioxane is added, with stirring over a period of about one hour, a solution of 15 parts of 17β-N-(3-dimethylaminopropyl)formamidoestra-1,3,5(10)-trien-3-ol 3-methyl ether in 250 parts of dioxane. The resulting reaction mixture is heated at the reflux temperature for about 20 hours, then is diluted successively with a solution of 7 parts of water in 25 parts of dioxane, 5.3 parts by volume of 20% aqueous sodium hydroxide and 24 parts of water. Filtration of that mixture removes the precipitated inorganic salts, which are washed on the filter with dioxane. The filtrate is evaporated to dryness under reduced pressure to afford 17β - N - (3-dimethylaminopropyl)-N-methylaminoestra-1,3,5(10)-trien-3-ol 3-methyl ether as a low-melting solid. This substance is further characterized by an optical rotation, in chloroform, of +52.5° and also by the following structural formula

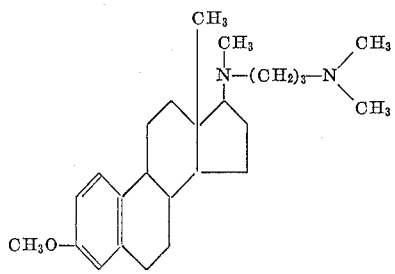

*Example 9*

The substitution of an equivalent quantity of 17β-N-(2 - diethylaminoethyl)formamidoestra - 1,3,5(10)-trien-3-ol 3-formate in the procedure of Example 8 results in 17β - N-(2-diethylaminoethyl)-N-methylaminoestra-1,3,5(10)-trien-3-ol.

*Example 10*

By substituting an equivalent quantity of 17β-N-(2-diethylaminoethyl)formamidoestra - 1,3,5(10)-trien-3-ol 3-ethyl ether and otherwise proceeding according to the processes described in Example 8, there is obtained 17β-N - (2 - diethylaminoethyl) - N - methylaminoestra-1,3,5(10)-trien-3-ol 3-ethyl ether.

*Example 11*

To a refluxing mixture of 4 parts of lithium aluminum hydride in 250 parts of dioxane, in an atmosphere of nitrogen, is added with stirring, over a period of about 30 minutes, a warm solution of 8 parts of 17β-N-(3-dimethylaminopropyl)formamidoestra - 1,3,5(10) - trien-3-ol 3-formate in 150 parts of dioxane. Refluxing and stirring is continued for about 20 hours, after which time the reaction mixture is diluted successively with 8 parts of water, 6 parts by volume of 20% aqueous sodium hydroxide, and 25.6 parts of water. The precipitated inorganic salts are removed by filtration and washed on the filter with dioxane. Concentration of the filtrate to dryness under reduced pressure affords a glass-like residue which is recrystallized from acetone to afford pure 17β-N - (3 - dimethylaminopropyl)-N-methylaminoestra-1,3,5(10)-trien-3-ol. This compound is characterized by infrared absorption maxima at about 2.75, 3.4, and 6.3 microns and also by an ultraviolet absorption maximum at about 280 millimicrons with a molecular extinction coefficient of about 1,840. It can be represented by the following structural formula

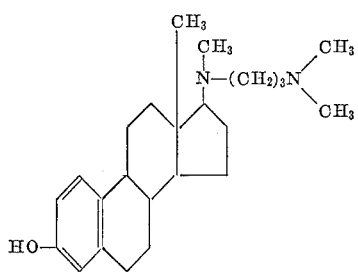

*Example 12*

To an ethereal solution of 17β-N-(3-dimethylaminopropyl) - N - methylaminoestra - 1,3,5(10)-trien-3-ol 3-methyl ether is added excess isopropanolic hydrogen chloride, and the resulting precipitate is collected by filtration and dried to afford 17β-N-(3-dimethylaminopropyl) - N - methylaminoestra - 1,3,5(10)-trien-3-ol 3-methyl ether dihydrochloride, characterized by an optical rotation, in chloroform, of +48°.

*Example 13*

To a solution of 17β-N-(3-dimethylaminopropyl)-N-methylaminoestra-1,3,5(10)-trien-3-ol in acetone is added excess isopropanolic hydrogen chloride, and the resulting precipitate is collected by filtration, then recrystallized from ethanol to produce 17β-N-(3-dimethylaminopropyl) N-methylaminoestra-1,3,5(10)-trien-3-ol dihydrochloride, which exhibits an optical rotation, in ethanol, of +45°.

What is claimed is:
1. A compound of the formula

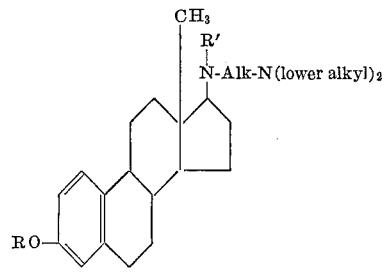

wherein R is a member of the class consisting of hydrogen, a formyl and a lower alkyl radical, R' is selected from the group consisting of hydrogen, a formyl and a methyl radical and Alk is a lower alkylene radical.

2. 17β - N - (3-dimethylaminopropyl)formamidoestra-1,3,5(10)-trien-3-ol 3-formate.

3. A compound of the formula

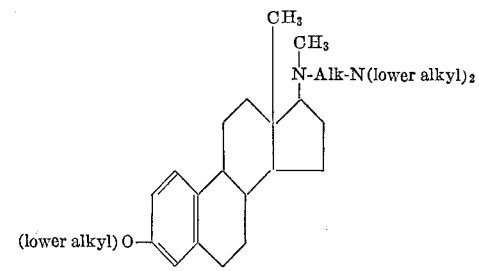

wherein Alk is a lower alkylene radical.

4. 17β - N - (3-dimethylaminopropyl)-N-methylaminoestra-1,3,5(10)-trien-3-ol 3-methyl ether.

5. 17β - N - (3-dimethylaminopropyl)-N-methylaminoestra-1,3,5(10)-trien-3-ol 3-methyl ether dihydrochloride.

6. A compound of the formula

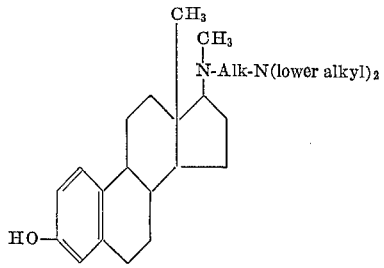

wherein Alk is a lower alkylene radical.

7. A compound of the formula

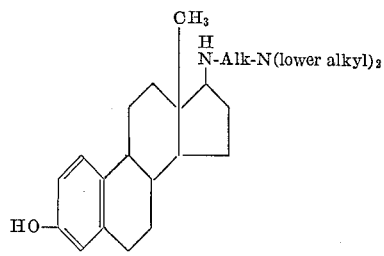

wherein Alk is a lower alkylene radical.

8. 17β - N - (3-dimethylaminopropyl)aminoestra-1,3,5(10)-trien-3-ol dihydrochloride.

9. A compound of the formula

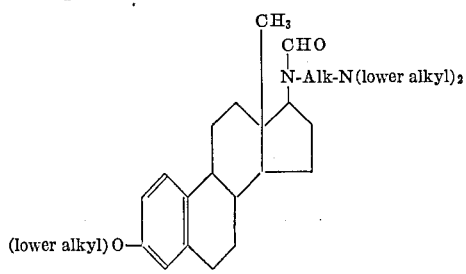

wherein Alk is a lower alkylene radical.

10. 17β-N-(3-dimethylaminopropyl) formamidoestra-1,3,5(10)-trien-3-ol 3-methyl ether.

11. 17β-N-(3-dimethylaminopropyl)formamidoestra-1,3,5(10)-trien-3-ol 3-methyl ether hydrochloride.

No references cited.

ELBERT L. ROBERTS, *Acting Primary Examiner.*
HENRY FRENCH, *Assistant Examiner.*